(12) United States Patent
Mao et al.

(10) Patent No.: US 11,343,511 B2
(45) Date of Patent: *May 24, 2022

(54) CONTENT-AWARE PREDICTIVE BITRATE LADDER

(71) Applicant: Comcast Cable Communications, LLC, Philadelphia, PA (US)

(72) Inventors: Weidong Mao, West Windsor, NJ (US); Alexander Giladi, Princeton, NJ (US); Alex Balk, Mountlake Terrace, WA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,119

(22) Filed: Jul. 1, 2020

(65) Prior Publication Data
US 2021/0021837 A1 Jan. 21, 2021

Related U.S. Application Data

(63) Continuation of application No. 16/235,105, filed on Dec. 28, 2018, now Pat. No. 10,735,739.
(Continued)

(51) Int. Cl.
*H04N 19/147* (2014.01)
*H04N 19/463* (2014.01)
(Continued)

(52) U.S. Cl.
CPC ......... *H04N 19/147* (2014.11); *H04N 19/115* (2014.11); *H04N 19/127* (2014.11);
(Continued)

(58) Field of Classification Search
CPC .. H04N 19/147; H04N 19/115; H04N 19/127; H04N 19/184; H04N 19/197;
(Continued)

(56) References Cited

U.S. PATENT DOCUMENTS 8,892,764 B1 * 11/2014 Ebersviller .......... H04N 19/102
     709/231
2014/0359678 A1   12/2014 Shivadas et al.
(Continued)

FOREIGN PATENT DOCUMENTS

EP   1195992 A1   4/2002

OTHER PUBLICATIONS

"Per-Title Encode Optimization," Netflix Technology Blog, Medium, Dec. 14, 2015, https://medium.com/netflix-techblog/per-title-encode-optimization-7e99442b62a2.
(Continued)

*Primary Examiner* — Dominic D Saltarelli
(74) *Attorney, Agent, or Firm* — Banner & Witcoff, Ltd.

(57) ABSTRACT

Methods, systems, and apparatuses may encode a media content item based on metadata from previous encoding. The encoding may also generate encoding metadata, which may comprise a qualitative or quantitative characterization of the encoded media content item. A prediction engine may, based on this metadata, determine new encoding settings for the same or a different video resolution. The prediction engine may cause an encoded media content item to be stored and may cause encoding of the media content item using the new encoding settings.

20 Claims, 6 Drawing Sheets

Related U.S. Application Data

(60) Provisional application No. 62/611,304, filed on Dec. 28, 2017.

(51) Int. Cl.

| | | |
|---|---|---|
| *H04N 19/115* | (2014.01) | |
| *H04N 19/127* | (2014.01) | |
| *H04N 19/184* | (2014.01) | |
| *H04N 19/36* | (2014.01) | |
| *H04N 19/154* | (2014.01) | |
| *H04N 19/15* | (2014.01) | |
| *H04N 19/124* | (2014.01) | |
| *H04N 21/235* | (2011.01) | |
| *H04N 21/234* | (2011.01) | |
| *H04N 21/24* | (2011.01) | |
| *H04N 21/231* | (2011.01) | |
| *H04N 21/222* | (2011.01) | |
| *H04N 21/218* | (2011.01) | |
| *H04L 65/60* | (2022.01) | |
| *H04L 65/80* | (2022.01) | |
| *H04N 21/2343* | (2011.01) | |
| *H04N 19/196* | (2014.01) | |

(52) U.S. Cl.
CPC ......... *H04N 19/184* (2014.11); *H04N 19/197* (2014.11); *H04N 19/36* (2014.11); *H04N 19/463* (2014.11); *H04N 21/2353* (2013.01); *H04N 21/23418* (2013.01); *H04N 21/23439* (2013.01); *H04N 21/2402* (2013.01); *H04L 65/607* (2013.01); *H04L 65/80* (2013.01); *H04N 19/124* (2014.11); *H04N 19/15* (2014.11); *H04N 19/154* (2014.11); *H04N 21/21815* (2013.01); *H04N 21/222* (2013.01); *H04N 21/231* (2013.01)

(58) Field of Classification Search
CPC ................. H04N 19/36; H04N 19/463; H04N 21/23418; H04N 21/23439; H04N 21/2353; H04N 21/2402
USPC ..................................................... 375/240.02
See application file for complete search history.

(56) References Cited

U.S. PATENT DOCUMENTS

| | | |
|---|---|---|
| 2015/0341632 A1 | 11/2015 | Syed et al. |
| 2016/0088322 A1 | 3/2016 | Horev et al. |
| 2016/0248474 A1 | 8/2016 | Gilson |
| 2016/0295216 A1 | 10/2016 | Aaron et al. |
| 2016/0337680 A1 | 11/2016 | Kalagi et al. |
| 2017/0048536 A1 | 2/2017 | Forehand et al. |
| 2017/0264968 A1 | 9/2017 | Mao et al. |
| 2017/0359580 A1 | 12/2017 | Su et al. |
| 2018/0192070 A1* | 7/2018 | Dupuis ................. H04N 19/85 |
| 2019/0158564 A1* | 5/2019 | Wang ..................... H04L 65/80 |
| 2019/0182556 A1* | 6/2019 | Liu .................... H04N 21/2187 |

OTHER PUBLICATIONS

"Command Line Options," x265 Documentation, MulticoreWare Inc, 2014, https://x265.readthedocs.io/en/default/cli.html.

Mar. 14, 2019—Extended European Search Report—EP 18248184.6.

Jul. 21, 2021—European Office Action—EP 18248184.6.

* cited by examiner

CONTENT-AWARE PREDICTIVE BITRATE LADDER

CROSS-REFERENCE TO RELATED APPLICATION

This application is a continuation of U.S. application Ser. No. 16/235,105, titled "Content-Aware Predictive Bitrate Ladder" and filed Dec. 28, 2018, now allowed, which claims the benefit of U.S. Provisional Application No. 62/611,304, titled "Content-Aware Predictive Bitrate Ladder" and filed Dec. 28, 2017, the disclosures of which are hereby incorporated by reference in their entirety.

BACKGROUND

Adaptive streaming technologies allow content providers to deliver the same media content in a variety of formats, such as in different video resolutions and/or bitrates. Content providers may encode and store the same media content in a variety of formats. One approach to generating such a variety of formats is content-aware encoding, which analyzes portions of content (e.g., scenes of a television show) in order to determine appropriate encoding parameters. Content-aware encoding often requires extensive trial encodes using a one-size-fits-all approach in order to determine appropriate encoding parameters. Such processes may be computationally wasteful and time-consuming.

SUMMARY

The following summary presents a simplified summary of certain features. The summary is not an extensive overview and is not intended to identify key or critical elements.

Systems, apparatuses, and methods are described for predictive encoding of multiple versions of media content. Encoders may encode media content items using starting encoding settings. Such starting encoding settings may comprise a low, average, or maximum bitrate, coded picture buffer (CPB) size, quantization parameter (QP), constant rate factor (CRF), resolution, and/or other parameters. That encoding process may generate metadata providing information about the quality of the encoded media content item. This metadata may be sent to a prediction engine, which may determine new encoding settings for the encoders based on the metadata. New encoding settings may, for example, predict an optimal bitrate for a different resolution version of the media content item.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
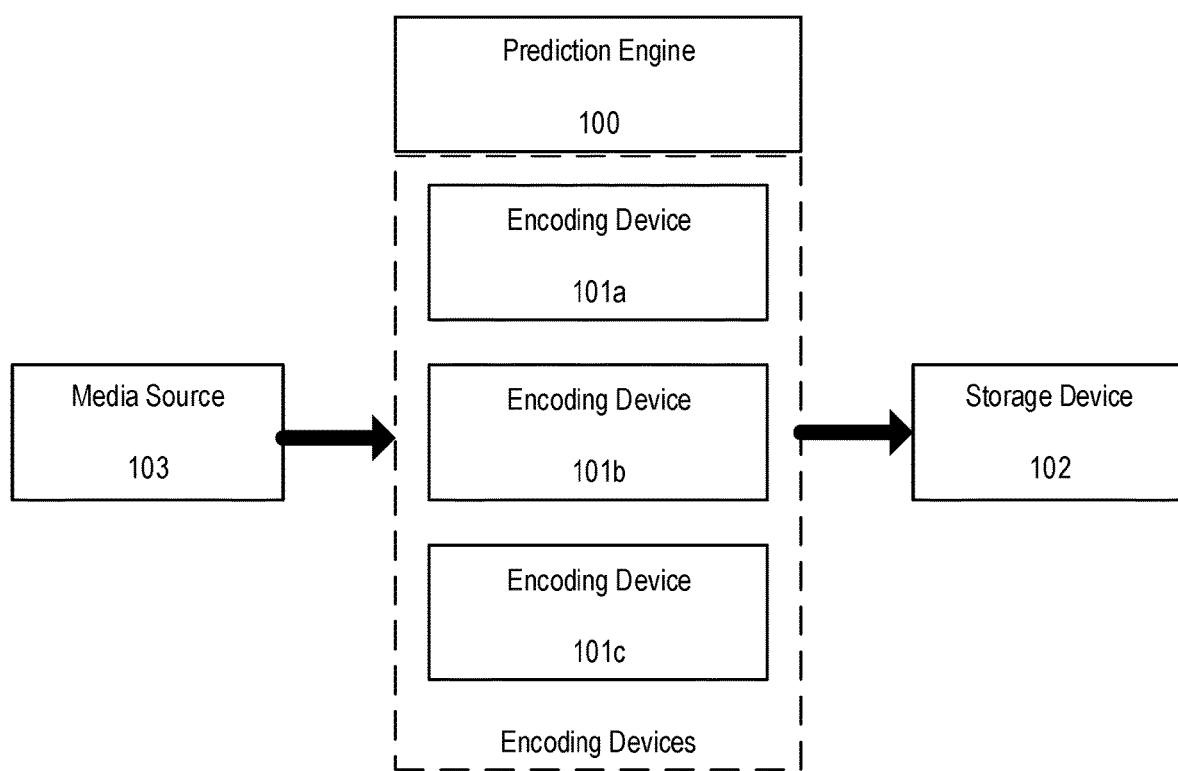
FIG. 1 shows an example system which encodes media content using encoders and a prediction engine.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example content encoding system that includes a prediction engine 100, encoders 101a-101c, a storage device 102, and a media source 103. Media content items from the media source 103 may be encoded by the one or more encoders 101a-101c into different versions of encoded media content items. Those encoded media content items may be stored by the storage device 102. Encoding by the encoders 101a-101c, as well as the decision to store the encoded media content items using the storage device 102, may be managed by the prediction engine 100. The prediction engine 100 may be communicatively coupled to the encoders 101a-101c and may send encoding settings and/or storage instructions to the encoders 101a-101c. The prediction engine 100 may receive metadata from the encoders 101a-101c that corresponds to and/or is generated in connection with the encoded media content items.

Each of the encoders 101a through 101c may be an encoding software program executing on a computing device. For example, each of the encoders 101a-101c may comprise instructions stored in a memory and that, when executed by one or more processors of a computing device, cause that computing device to encode content items using a video encoding standard such as, e.g., MPEG-1, MPEG-2, MPEG-4 Advanced Video Coding (AVC), VP8, VP9, AV1, and/or other encoding standard. Each of the encoders 101a-101c may be executing on a separate computing device, and/or some or all of the encoders 101a-101c could be executing on a single computing device.

The prediction engine 100 may also be a program executing on a computing device. For example, the prediction engine 100 may comprise instructions stored in a memory that, when executed by one or more processors of a computing device, may cause that computing device to perform one or more of the operations described herein. The prediction engine 100 may execute on the same computing device(s) as the encoders 101a-101c and/or may execute on one or more separate computing devices. The prediction engine 100 may comprise a plurality of computing devices or logical software elements which together comprise a neural network for analyzing metadata and determining, for example, new encoding settings for the encoders.

The storage device 102 may be one or more computing devices separate from computing devices executing the prediction engine 100 or the encoders 101a-101c. For example, the storage device 102 may comprise a database server or other type of server. Additionally and/or alternatively, the storage device may be part of the computing device(s) that execute one or more of the prediction engine 100 and/or the encoders 101a-101c. Communications between the encoders 101a-101c and the prediction engine 100 may be different based on the configuration of both the encoders 101a-101c and the prediction engine 100. For example, if the prediction engine 100 is executing on a server separate from the encoders 101a-101c, metadata may be sent to the prediction engine 100 via a network protocol, and the prediction engine 100 may transmit instructions to the encoders 101a-101c over the same or a different network protocol. As another example, if the prediction engine 100 and the encoders 101a-101c execute on the same computing device, communications may be facilitated via an operating system.

Media content items sent from the media source 103 to the encoders 101a-101c may be any form or type of content. Examples of content type include video of a movie, video of a television show, video of a video game, video for a real-time video feed, and other types of video. A media content item may be of any arbitrary length and/or may be part of a larger media content item (e.g., a five-second segment of a film). A video feed from the media source 103 to the encoders 101a-101c may be in any compressed or uncompressed format. In some examples, a video feed from the media source 103 may be in a raw format, e.g., sensor data from camera pixels that has not been subject to preprocessing.

Although three encoders are shown in FIG. 1, more or fewer encoders may be used in other examples. Each encoder may be configured to handle the same or different media content items. For example, one encoder may be configured to handle high-bitrate or high-resolution media content items and another encoder may be configured to handle low-bitrate or low-resolution media content items. The encoders 101a-101c may be configured with the same or different encoding software and/or encoding settings. For example, one encoder may be configured to encode high definition video in a first format, whereas another encoder may be configured to encode video for low resolution mobile devices in a second format.

The encoders 101a-101c may, when encoding media content items and creating encoded media content items, also generate metadata corresponding to the encoded media content items. Such metadata may comprise any qualitative or quantitative characterization of the encoded form of the media content item. The metadata may comprise data that suggests an overall quality level of the encoded media content item, such as a peak signal-to-noise ratio (PSNR) value. The metadata may comprise a frame size in bits, an average QP or CRF value for one or more frames, a percentage of intra- and inter-coded blocks, a frame cost in bits as inter- and intra-coded frame, a histogram of pixel intensities, and/or other data. An encoder may subdivide content (e.g., a frame) into blocks, and the metadata may additionally or alternatively comprise aggregated per-block data, such as an indication of distortion (e.g., pixel-domain and frequency-domain differences between incoming and encoded blocks as corrected for human perception), a quantity of bits spent on encoding motion vectors, coding tree unit information, and/or other data. The metadata may be specific to a particular version of an encoded media content item.

The metadata generated by the encoders 101a-101c may be stored in memory by the encoder and/or sent to the prediction engine 100. The encoders 101a-101c need not send the metadata to the prediction engine 100 for every encode, but may rather store the metadata in memory for multiple encoding processes (e.g., for every 3 encoding processes) and send collected metadata to the prediction engine 100.

The encoders 101a-101c may additionally or alternatively send metadata based on a rule associated with, for example, a media content item, metadata, and/or the encoders 101a-101c. For example, the encoders 101a-101c may be configured to store metadata until an encoding process results in a PSNR value greater than 42 dB, and then send all stored metadata to the prediction engine 100. As another example, the prediction engine 100 may be configured to instruct the encoders 101a-101c to send metadata based on an amount of the metadata reaching a threshold (e.g., a file size and/or a predetermined value). The encoders 101a-101c may send metadata in batches for quickly-performed encoding processes (e.g., encoding at 480p), but may send metadata for every longer encoding process performed (e.g., encoding at 1080p) so as to maximize computational efficiency and avoid unnecessary repetition of long encoding processes.

Encoded media content items may be stored on the storage device 102. Any number of storage devices may exist; one is shown in FIG. 1 for simplicity. Storage may comprise moving an encoded media content item from a buffer or other temporary storage to long-term storage (e.g., a hard drive) and/or may comprise transmitting an encoded media content item to a separate computing device on a network.

The prediction engine 100 may be configured to analyze metadata and determine new encoding settings for the encoders 101a-101c, e.g., for a higher resolution version of a media content item. The prediction engine 100 may also be configured to determine whether one or more versions of one or more encoded media content items corresponding to the metadata should be stored (e.g., by the storage device 102). For example, the prediction engine 100 may analyze metadata corresponding to a 480p/1 Mbps version of an encoded media content item and, based on this metadata, one or more rules, storage limitations, and/or other considerations, may instruct the encoders 101a-101c to encode a 720p version of the media content item at 10 Mbps and to store the 480p/1 Mbps version of the media content item.

The prediction engine 100 may analyze received metadata, determine an optimized version of encoded media content items at a certain resolution, and cause that optimized version of the encoded media content item to be stored. Such an optimized version need not be the highest bitrate version, and may instead, for example, represent a version having a desirable tradeoff between bitrate and quality. Quality may refer to one or more measures of quality-indicating parameters in the metadata that are indicative of whether a viewer will perceive a displayed media content item to be of higher or lower value. Such quality-indicating parameters may include, e.g., whether there is tiling, pixilation, banding, blur, or other noticeable defects; whether there is stopped or uneven motion; as well as quality metrics such as PSNR, Structural Similarity Index (SSIM), Visual Information Fidelity (VIF), Video Multi-Method Assessment Function (VMAF), Spatiotemporal Most Apparent Distortion (ST-MAD), and/or Natural Image Quality Evaluator (NIQE). The optimized version may be determined based on a variety of considerations. For example, an optimized version for a given resolution may be a bitrate at which any increases in quality by increasing bitrate will fall below a predetermined threshold. The prediction engine 100 may also send new encoding settings to the encoders 101a-101c. The new encoding settings may be to encode the media content item at a different bitrate for a resolution at which the item has already been encoded. For example, the quality of the first encode may have been too low. As another example, the prediction engine 100 may predict that encoding the same media content item at a lower bit rate will not result in significant loss of quality. The new encoding settings may be to encode a media content item at a higher resolution and at a bitrate predicted from metadata from a lower resolution encoding. Such new encoding settings may reflect prediction, by the prediction engine 100, of encoding settings which may produce the optimized version of the media content item at the higher resolution. The prediction engine 100 may be configured to store metadata corresponding to previous encoding processes and make predictions based on such metadata. In this manner, the prediction engine 100 may procedurally improve its prediction of new encoding settings by, e.g., avoiding encoding settings associated with undesirable results with respect to quality-indicating parameters.

For example, the encoder 101*a* may encode three different versions of a media content item at a first resolution: a 480p/1 Mbps version, a 480p/2 Mbps version, and a 480p/3 Mbps version, may send metadata for all three encodes to the prediction engine 100, and may receive from the prediction engine 100 an instruction to store the 480p/2 Mbps version and to next encode the media content item using new encoding settings specifying a 720p/10 Mbps encode. The instruction to use new encoding settings specifying a 720p/10 Mbps encode may be based on an analysis of the metadata provided for the 480p/2 Mbps version and a prediction that the new encoding settings may produce an optimized version of the media content item at 720p. This process may be repeated for multiple encoding processes to generate and store a plurality of different versions of the encoded media content item.

The new encoding settings may comprise, for example, a maximum or average bitrate selected from a plurality of possible bitrates. The prediction engine 100 may be configured to target specific bitrate values (e.g., those which may be best transmitted over different network interfaces). The plurality of possible bitrates may be predetermined and/or based on one or more network interfaces. A plurality of predefined, discrete bitrates may be available for encoding at each of multiple resolutions.

Figure 2:
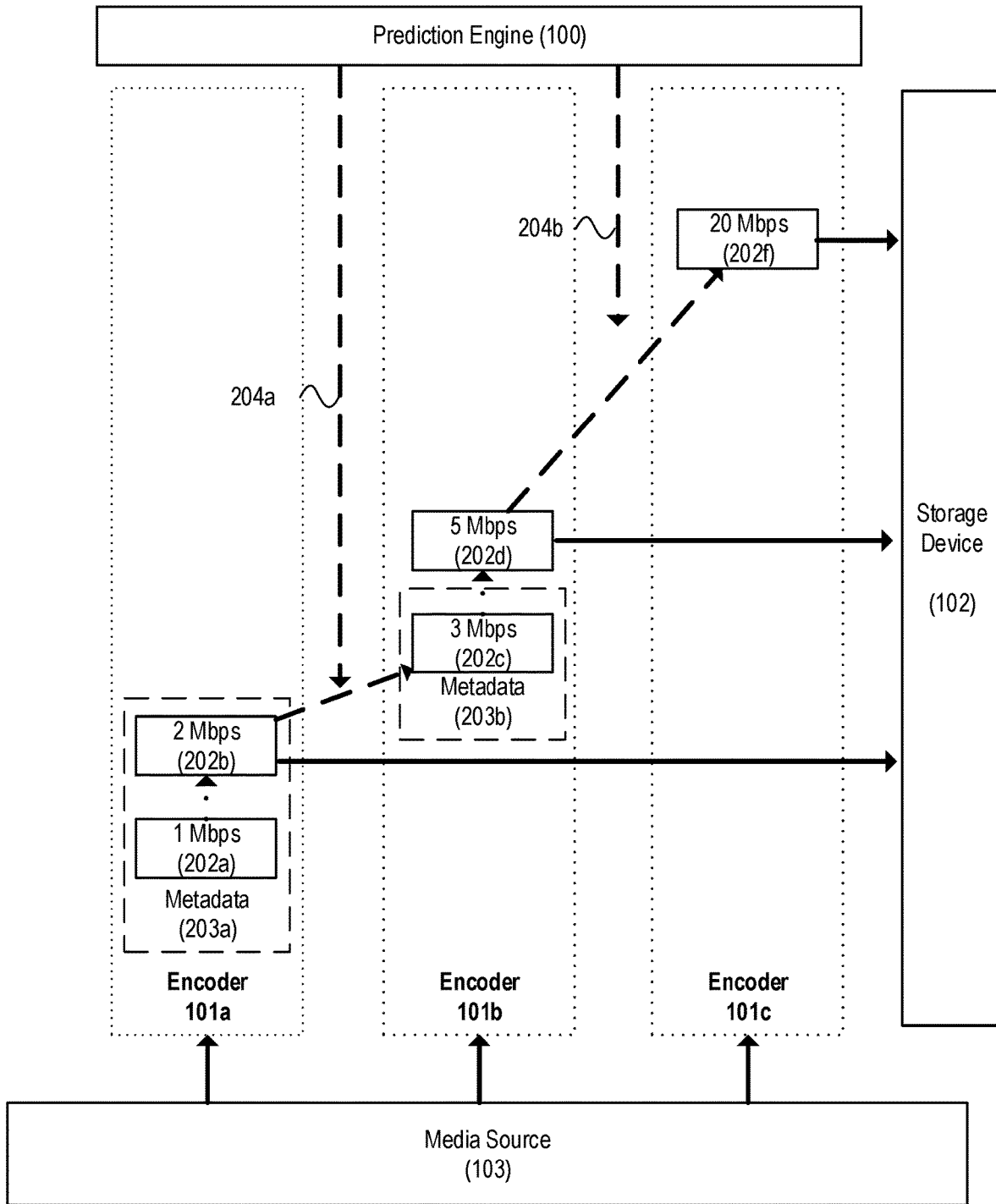
FIG. 2 shows an example of a bitrate ladder process.

FIG. 2 shows an example encoding process for media content items using the prediction engine 100 and encoders 101*a*-101*c*. The example of FIG. 2 depicts three media content resolutions. Encoder 101*a* may encode at one or more bitrates at a resolution of 640×480 (480p). Encoder 101*b* may encode at one or more bitrates at a resolution of 1280×720 (720p). Encoder 101*c* may encode at one or more bitrates at a resolution of 1920×1080 (1080p). Any number or variety of resolutions, bitrates, or other encoding parameters may be used in accordance with the features described herein.

A first encode of a media content item may not be based on instructions from the prediction engine 100 but rather may use starting encoding settings. Starting encoding settings may comprise any encoding settings intended to be used first by a lowest resolution encoder. Though starting encoding settings may be low such that future encoding settings may be larger, starting encoding settings need not comprise the lowest available bitrate at the lowest available resolution. In the example shown in FIG. 2, the starting encoding settings are 480p at a maximum bitrate of 1 Mbps (e.g., box 202*a*). The encoders may be configured to use starting encoding settings to encode the media content item and to send corresponding metadata to the prediction engine 100 such that the prediction engine 100 may have a baseline set of metadata. The starting encoding settings may be manually set by an administrator. The prediction engine 100 may additionally or alternatively determine the starting encoding settings based on previous encodes of other media content items. Starting encoding settings may be based on properties of the media content item: for example, television shows may have a first starting encoding setting, and movies may have a second starting encoding setting that is higher than the first starting encoding setting.

As an example, the encoder 101*a* of FIG. 2 may begin by generating two versions of an encoded media content item at 480p (e.g., boxes 202*a*-202*b*), generate corresponding metadata (e.g., box 203*a*), and send said metadata to the prediction engine 100. The prediction engine 100 may, based on an analysis of the metadata received, instruct (e.g. arrow 204*a*) the encoder 101*a* to store the 420p/2 Mbps version of the media content item (e.g., the encoded version corresponding to box 202*b*) in the storage device 102. The prediction engine 100 may also instruct the encoder 101*b* to next generate an encoded media content item at the next highest resolution and at a bitrate predicted based on the received metadata associated with the 420p/2 Mbps version (720p/3 Mbps, box 202*c*). The prediction engine 100 may use metadata from an optimized 480p encode to predict an optimized bitrate for a 720p encoding process. The encoder 101*b* may generate a 720p/3 Mbps version of the encoded media content item (box 202*c*) and create metadata (203*b*) corresponding to that version of the media content item. If metadata corresponding to the 720p/3 Mbps version of the encoded media content item (box 203*b*) may suggest that 3 Mbps does not provide a target level of quality for 720p (that is, that the prediction engine 100 predicted incorrectly), the prediction engine 100 may instruct (arrow 204*b*) the encoder 101*b* to generate a 720p/5 Mbps version of the encoded media content item. Based on metadata (not shown) associated with that version, the prediction engine may instruct the encoder 101*b* to store the 720p/5 Mbps version. Based on metadata from the 720/5 Mbps version, the prediction engine may predict 20 Mbps as the optimized bitrate for a 1080p version of the media content item and instruct the encoder 101*c* to generate and store a 1080p/20 Mbps version of the encoded media content item (202*f*) of the encoded media content item.

Though bitrate is depicted in FIG. 2, the prediction engine 100 may also or alternatively transmit instructions relating to one or more other media encoding parameters. For example, parameters affecting pre-filter or in-loop filters, one or more scaling lists, a number of reference frames for encoding, and/or rate-distortion settings may be predicted and transmitted. Parameters need not relate exclusively to video quality. For example, parameters relating to encoding speed or format may be selected. As another example, a QP may be predicted by the prediction engine 100 and transmitted to one or more of the encoders 101*a*-101*c*.

Though resolution is discussed with respect to FIG. 2, the prediction engine 100 may also or alternatively make predictions regarding media encoding parameters based on other constraints. For example, the prediction engine 100 may transmit media encoding parameters based on a target resolution, a target frame rate, a target color space, and/or a target bit depth of the media content.

Based on metadata corresponding to a lower resolution version of an encoded media content item, the prediction engine 100 may predict an optimized bitrate for encoding the media content item at a higher resolution. This process may continue for numerous resolutions to obtain, at each resolution, a version of the encoded media content item that is generated at an optimized bitrate corresponding to optimized quality. These versions, collectively, may form a bitrate ladder for the media content item and may be stored in the storage device 102 for subsequent download to different types of user devices.

The prediction engine 100 may, based on metadata received, instruct the encoders 101*a*-101*c* to use new encoding settings. The new encoding settings need not follow a particular pattern and need not be increasing: the prediction engine 100 need not merely increment the encoding settings. The prediction engine 100 may determine new encoding settings based on determining whether the combination of higher resolution and lower bitrate may provide an optimized encoded media content item as compared to simply a higher bitrate in view of considerations such as, for example, bandwidth requirements.

Encoded media content items stored in the storage device 102 need not be the highest quality versions of the media content item. For example, an optimized version of media content item at 720p may be a version which has a bitrate which provides good video quality but which may have the potential to consume excessive bandwidth when streamed. The prediction engine 100 may weigh a variety of factors in determining whether to store an encoded media content item, such as available storage space, and/or strategies for adaptive streaming. For example, the prediction engine 100 may cause the encoders to store encoded versions of media content items with a low bitrate so that versions of the media content items may be loaded by a viewer even under poor network conditions.

Figure 3:
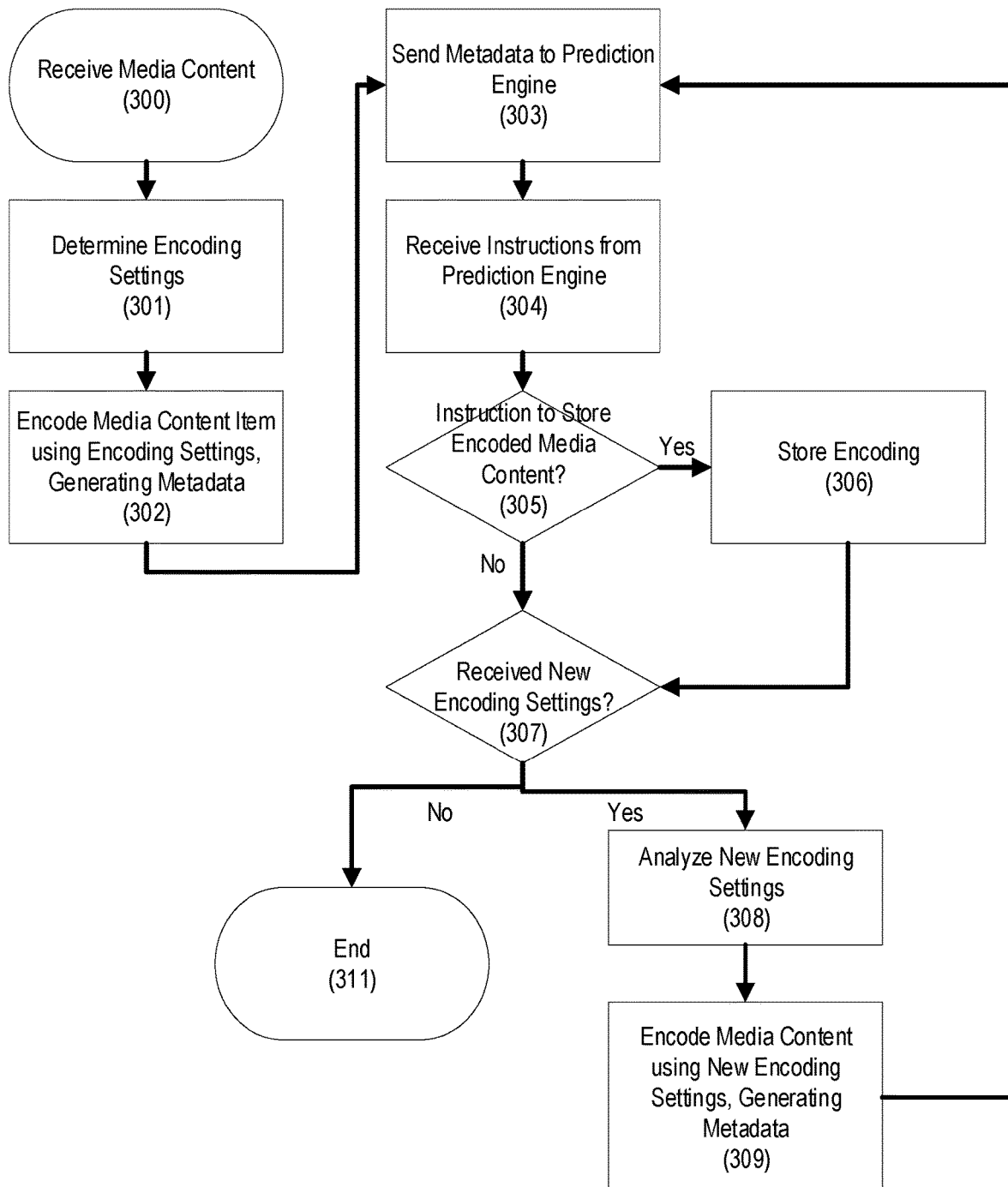
FIG. 3 is a flow chart showing steps of an example process for encoding media content.

FIG. 3 is a flow chart showing steps which may be performed by a single encoder communicatively coupled to a prediction engine. Different encoders may be used in connection with generating versions of an encoded media content item, and associated metadata, at particular resolutions. The details of one or more steps in FIG. 3 may vary depending on what part of a bitrate ladder (e.g., the resolution/bitrate combination) the encoder will generate. A single encoder may perform operations shown in FIG. 3 in connection with multiple resolutions. For example, an encoder may generate a version of an encoded media content item at a first resolution. That encoder may receive, from the prediction engine 100 and based on metadata associated with that first resolution version, instructions to generate a version of the encoded media content item at a higher resolution. This may continue for increasingly higher resolutions.

In step 300, an encoder may receive a media content item. Receipt of the media content item may comprise determining a location of media content item and retrieving the media content item (e.g., from a server). Receipt of the media content item may additionally and/or alternatively comprise loading a media content item into memory, such as long-term or temporary storage. The media content item may be in any format which may be encoded by the encoder. For example, receiving the media content item may comprise receiving an entire media file (e.g., an entire television show) and splitting the media file into discrete segments (e.g., for every five seconds and/or on a scene-by-scene basis). The media content need not be an entire file, such as an entire episode of a television show or a movie. For example, the media content may be a scene of a larger work, such as a movie, television show, or the like. Receiving the media content may comprise receiving the entirety of media content (e.g., an entire file corresponding to the full length of a movie) and executing scene change detection algorithms to determine one or more scenes for encoding. Steps described herein need not be performed on the entirety of media content, but may instead be performed with respect to portions of the media content (e.g., five-second portions of a television show, a given scene of a movie, a particular time period of a sports broadcast, etc.).

In step 301, the encoder may determine encoding settings corresponding to the media content item. If step 301 is being performed by an encoder for the lowest resolution in a bitrate ladder (e.g., the encoder 101*a*), determining the encoding settings may comprise referring to default or other pre-set starting encoding settings. Default or preset encoding settings may be based on target devices and/or networks. For example, if a content delivery network supports older smart-phones with 480p screens incapable of displaying video over 3 Mbps, then the starting encoding settings may cause encoding of 480p/3 Mbps video.

Starting encoding settings may vary based on the media content item. Different starting encoding settings may exist based on a category of the media content item (e.g., the genre of the media content item), length of the media content item, type of media content item (e.g., movie, television show), and/or popularity of the media content item. For example, the starting encoding settings for a feature film may be higher than for an older television show. As another example, the starting encoding settings may be based on a popularity of the media content item: a low-popularity show may be associated with very low starting encoding settings such that a low bitrate version of the media content item may be stored. It may be desirable in some examples to use a relatively high starting encoding setting.

If step 301 is being performed by an encoder associated with a resolution that is not at the bottom of a bitrate ladder (e.g., the encoders 101*b* and 101*c*), determining encoding settings may comprise receiving the encoding sittings from the prediction engine 100. The received encoding settings may comprise a bitrate that has been predicted by the prediction engine 100 based on metadata from encoding at a lower resolution.

In step 302, the encoder may encode the media content item using the encoding settings determined in step 301. A version of the encoded media content item generated in step 302 may be buffered pending a decision (by the prediction engine 100) to store that version or to encode the media content item at the same resolution but at a different bitrate. As part of step 302, the encoder may generate metadata corresponding to the version of the encoded media content item created based on the settings from step 301. The metadata may be any output provided by the encoding process and may depend significantly on the encoding process performed. For example, some encoding processes may provide a PSNR value corresponding to all or part of a frame or portion of the media content item; however, others may not. Metadata may also comprise information determined by the encoder based on analysis of the encoded media content item after encoding. For example, an encoder may encode, into a file, the media content item, and analyze the file to determine a file size.

In step 303, the encoder may send metadata corresponding to an encoded media content item to the prediction engine 100. Sending metadata to the prediction engine 100 may include transmitting metadata over a network or allowing the prediction engine 100 to access the metadata in memory. The metadata sent to the prediction engine 100 need not comprise all metadata from step 302. For example, the encoder may limit metadata sent, to the prediction engine 100, to metadata known to be material in determining new encoding settings.

In step 304, the encoder may receive, from the prediction engine 100, instructions based on the metadata sent in step 303. Such instructions may include an instruction on whether to store the version of the encoded media content item and/or whether to encode the media content item using different encoding settings. For example, the prediction engine 100 may instruct the encoder to encode the media content item at a different resolution and/or a different bitrate.

In step 305, the encoder may receive an instruction from the prediction engine 100 indicating whether to store the generated version of the encoded media content item from step 302. If the encoder received an instruction from the prediction engine 100 in step 305 to store the generated version of the encoded media content item from step 302, the encoder may, in step 306, cause the generated version of the encoded media content item to be stored in the storage device 102. Storage may include retaining an encoded media content item in long-term memory, such as by moving the encoded media content item from short-term memory to a hard drive and/or other long-term storage media. The encoded media content item may, for example, be transmitted over a communication network to a storage server. An encoded media content item need not be stored at the encoder, but may be stored elsewhere, such as on a remote server. From step 306, the encoder may proceed to step 307. If the encoder did not receive an instruction from the prediction engine 100 in step 305 to store the encoded media content item, the encoder may proceed to step 307 directly from step 305.

In step 307, the encoder may determine if new encoding settings were received from the prediction engine in step 305. If new encoding settings were not received in step 305, the encoder may cease encoding the media content item and proceed from step 307 to step 311. This path to step 311 may correspond to reaching step 307 from step 306 based on storing a version of the encoded media content item.

If the encoder did receive instructions from the prediction engine 100 in step 305 to encode the media content item at different settings (e.g., at a different bitrate), the encoder may proceed from step 307 to step 308. In step 308, the encoder may analyze new encoding settings received from the prediction engine 100 in step 305. Such analysis may comprise, for example, determining which encoding settings may be used by software executing on the encoder. The new encoding settings may be new, but need not be higher quality than previous settings. For example, the prediction engine may have previously provided encoding settings which resulted in an unacceptably large file size such that subsequent encoding settings may comprise a lower average bitrate or similarly lower encoding setting.

In step 309, the encoder may encode the media content item using the new encoding settings and generate a second encoded version of the media content item. As part of step 309, the encoder may generate metadata associated with that second encoded version of the media content item. From step 309, the encoder may return to step 303.

Figure 4:
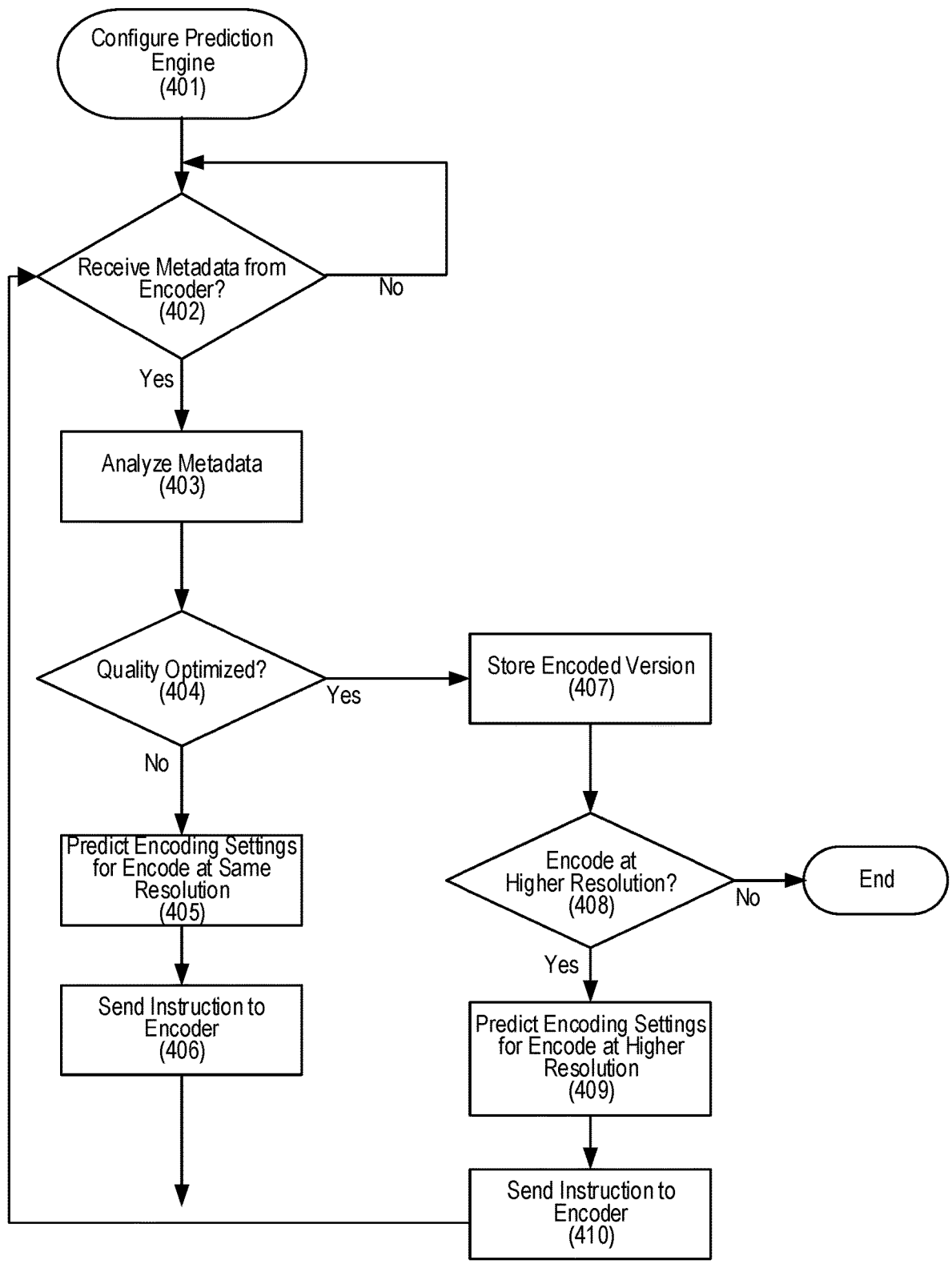
FIG. 4 is a flow chart showing steps of an example process for a prediction engine.

FIG. 4 is a flow chart of an example process which may be performed by the prediction engine 100. In step 401, the prediction engine 100 may be configured. Configuration may include determining parameters for encoding settings, such as a plurality of available bitrates for each of a plurality of resolutions.

In step 402, the prediction engine 100 may determine if it has received metadata from an encoder. If not, and as indicated by the "No" branch, the prediction engine may repeat step 402 until metadata is received. If the prediction engine 100 determines in step 402 that it has received metadata, the prediction engine 100 may proceed to step 403.

The prediction engine 100 may analyze the received metadata in step 403. The analysis of step 403 may comprise determining whether a quality of an encoded media content item corresponding to the received metadata is optimized. This determination may comprise a determination that the quality is too low and that the media content item should be encoded again at the current resolution, but at a higher bit rate. Determining that the quality is too low may comprise determining that one or more quality-indicating parameters has a value below a predefined threshold for a particular type of content. As but on example, PSNR values of T1 or higher may correlate with a minimum acceptable quality level. If the metadata received in step 402 indicates a PSNR below T1, the prediction engine 100 may determine that the media content item corresponding to that metadata should be encoded at the same resolution but at a higher bit rate.

Determining whether a quality of an encoded media content item corresponding to the received metadata is optimized may additionally or alternatively comprise a determination that that the quality is very high, which determination may suggest that encoding at a lower bitrate may be appropriate. For example, increased values of PSNR above a certain threshold T2 may only represent minor quality improvements that are imperceptible to many viewers. Moreover, obtaining increases in PSNR above T2 may require greater increases in bitrate than are needed for similar increases in PSNR below T2. If the metadata received in step 402 indicates a PSNR above T2, the prediction engine 100 may determine that the media content item corresponding to that metadata should be encoded at the same resolution but at a lower bit rate.

In step 404, the prediction engine 100 may determine, based on the analyses of step 403, whether the quality of the encoded media content item corresponding to the received metadata is optimized. If the quality is not optimized, the prediction engine 100 may proceed to step 405. In step 405, the prediction engine may determine another bitrate for encoding the media content item at the current resolution. If the quality was too low, the prediction engine 100 may select the next highest bitrate. If the quality was very high, the prediction engine 100 may select the next lowest bitrate. The prediction engine may also adjust other encoding settings, such as QP.

In step 406, the prediction engine 100 may send, to an encoder, an instruction comprising the predicted new encoding settings from step 405. The prediction engine 100 may return to step 402 and await receipt of metadata from the encoder relating to the encoding at the new encoding settings.

If the prediction engine determines in step 404 that, based on the analyses of step 403, the quality of the encoded media content item is optimized, the prediction engine 100 may proceed to step 107. In step 407, the prediction engine 100 may cause that encoded media content item to be stored. Step 407 may comprise sending, to an encoder, an instruction to store the encoded media content item. Such instruction may comprise an indication of where to store the encoded media content item.

In step 408, the prediction engine 100 may determine whether the media content item should be encoded at a higher resolution. The prediction engine 100 may determine to encode at a higher resolution based on determining, in step 401, a plurality of resolutions at which to encode a media content item. If the version of the encoded media content item stored in step 408 was at a resolution lower than the highest resolution of the plurality of resolutions from the configuration, encoding at a higher resolution may be performed. If the prediction engine 100 determines that encoding at a higher resolution should not be performed, and as indicated by the "No" branch, the process may end. If the prediction engine 100 determines that encoding at a higher resolution should be performed, the prediction engine 100 may proceed to step 409.

In step 409, the prediction engine 100 may predict new encoding settings for encoding at the higher resolution. The new encoding settings may include a bitrate for encoding at the higher resolution. The prediction engine 100 need not simply pick the lowest available bitrate. Instead, the prediction engine 100 may determine a bitrate likely to result in an optimized quality. The prediction engine 100 may determine that bitrate based on one or more of the analyses, performed in step 403, of the metadata corresponding to the encoded media content item for which an instruction to store was sent in step 407.

Prediction of a new encoding setting in step 409 may be performed in various ways. The prediction of step 409 may be based on historical metadata corresponding to the same or different media content items. The prediction engine 100 may learn over time prediction strategies and methods which may improve its ability to determine new encoding settings. The prediction engine 100 may use a history of metadata from other media content items to determine a metadata trend or similar correlation associated with metadata and, based on such a metadata trend, predict a new encoding setting. The prediction engine 100 may comprise or be communicatively coupled with a neural network to facilitate such learning. Prediction of new encoding settings may be based on characteristics of a media content item. Such characteristics may include a popularity of the media content item, a genre of the media content item, a total length of the media content item, and/or other information. For example, a daytime television show may cause the prediction engine 100 to predict different new encoding settings than a feature film.

In step 410, the prediction engine 100 may send an instruction to an encoder indicating the new encoding settings. The instruction may be similar to that of step 406. The prediction engine 100 may return to step 402 and await receipt of metadata from the encoder.

Figure 5:
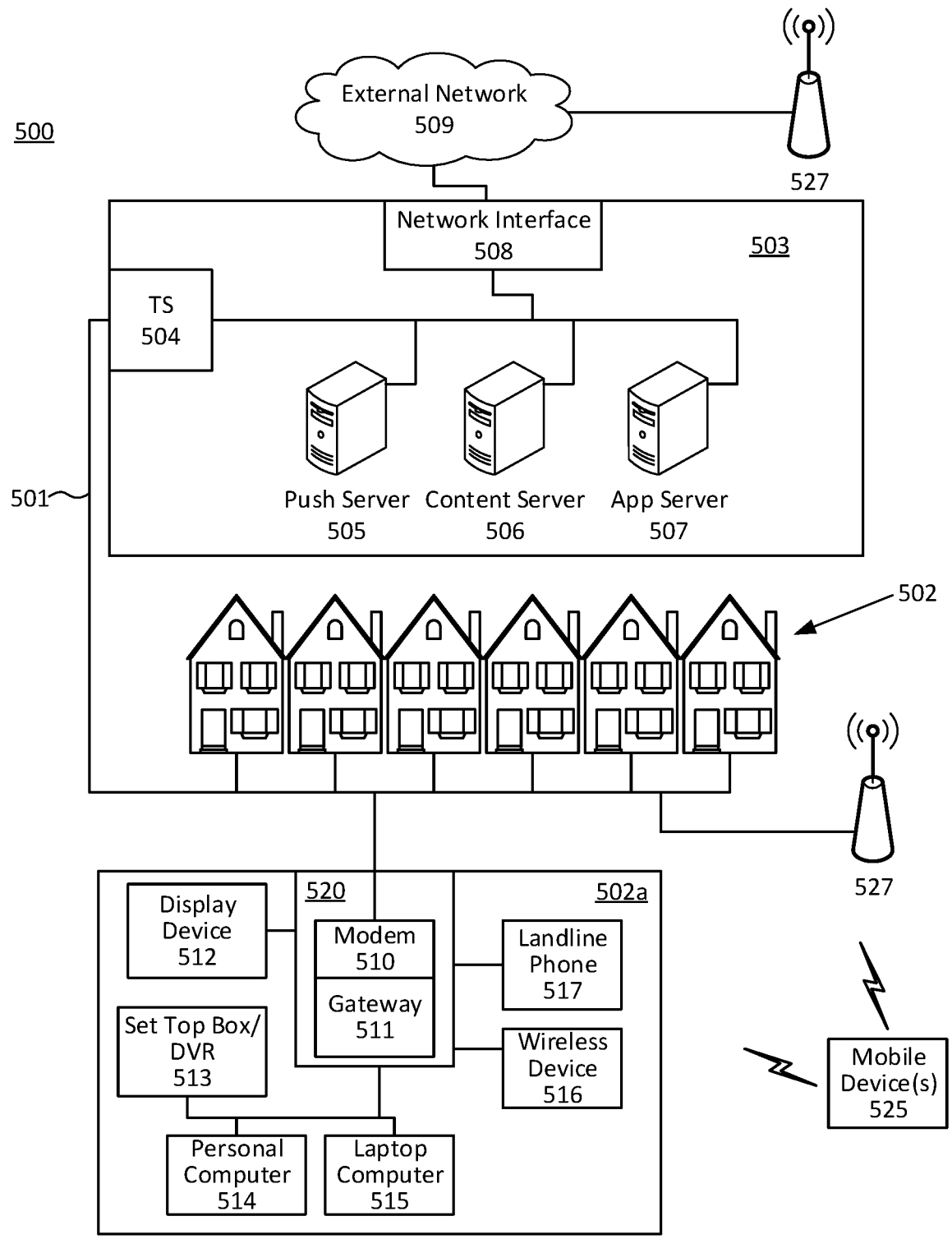
FIG. 5 shows an example communication network.

FIG. 5 shows an example communication network 500 on which features described herein may be implemented. For example, one or more servers (e.g., content server 506 and/or application server 507) may be configured to act as an encoding device, e.g., by executing one or more encoders for encoding media content items and/or performing other encoder operations. One or more servers (e.g., content server 506 and/or application server 507) may be configured to execute the prediction engine 100. Also or alternatively, one or more computing devices configured to act as one or more encoding devices and/or as to execute the prediction engine 100 may be located elsewhere in the communication network 500. The communication network 500 may be configured to transmit media content items from a media source (not shown) located in the network 500 to encoders executing on one or more of servers 505-507. Content server 506 may be comprise the storage device 102, and/or the storage device 102 may be located elsewhere in the communication network 500. Features described herein may be implemented on the communication network 500 in order to, for example, allow the prediction engine 100 to manage numerous encoders distributed across a larger network.

Encoded versions of media content items may be sent over the communication network 500 to a premises and reproduced on, for example, one or more user devices located within an example premises 502a. Examples of user devices in the premises 502a include a laptop computer 515, a display device 512, and a personal computer 514. Such user devices may also comprise mobile devices, such as mobile devices 525.

The communication network 500 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 500 may use a series of interconnected communication links 501 (e.g., coaxial cables, optical fibers, wireless links, etc.) to connect multiple premises 502 (e.g., businesses, homes, consumer dwellings, train stations, airports, etc.) to a local office 503 (e.g., a headend). The local office 503 may send downstream information signals and receive upstream information signals via the communication links 501. Each of the premises 502 may comprise devices, described below, to receive, send, and/or otherwise process those signals and information contained therein.

The communication links 501 may originate from the local office 503 and may comprise components not shown, such as splitters, filters, amplifiers, etc., to help convey signals clearly. The communication links 501 may be coupled to one or more wireless access points 527 configured to communicate with one or more mobile devices 525 via one or more wireless networks. The mobile devices 525 may comprise smart phones, tablets or laptop computers with wireless transceivers, tablets or laptop computers communicatively coupled to other devices with wireless transceivers, and/or any other type of device configured to communicate via a wireless network.

The local office 503 may comprise an interface 504, such as a termination system (TS). The interface 504 may comprise a cable modem termination system (CMTS) and/or other computing device(s) configured to send information downstream to, and to receive information upstream from, devices communicating with the local office 503 via the communications links 501. The interface 504 may be configured manage communications among those devices, to manage communications between those devices and back-end devices such as the servers 505-507, and/or to manage communications between those devices and one or more external networks 509. The local office 503 may comprise one or more network interfaces 508 that comprise circuitry needed to communicate via the external networks 509. The external networks 509 may comprise networks of Internet devices, telephone networks, wireless networks, fiber optic networks, and/or any other desired network. The local office 503 may also or alternatively communicate with the mobile devices 525 via the network interfaces 508 and one or more of the external networks 509, e.g., via one or more of the wireless access points 527.

The push notification server 505 may be configured to generate push notifications to deliver information to devices in the premises 502 and/or to the mobile devices 525. The content server 506 may be configured to provide content to devices in the premises 502 and/or to the mobile devices 525. This content may comprise, for example, video, audio, text, web pages, images, files, etc. The content server 506 (or, alternatively, an authentication server) may comprise software to validate user identities and entitlements, to locate and retrieve requested content, and/or to initiate delivery (e.g., streaming) of the content. The application server 507 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 502 and/or to the mobile devices 525. The local office 503 may comprise additional servers, additional push, content, and/or application servers, and/or other types of servers. Although shown separately, the push server 505, the content server 506, the application server 507, and/or other server(s) may be combined. The servers 505, 506, and 507, and/or other servers, may be computing devices and may comprise memory storing data and also storing computer executable instructions that, when executed by one or more processors, cause the server(s) to perform steps described herein.

An example premises 502a may comprise an interface 520. The interface 520 may comprise circuitry used to communicate via the communication links 501. The interface 520 may comprise a modem 510, which may comprise transmitters and receivers used to communicate via the communication links 501 with the local office 503. The modem 510 may comprise, for example, a coaxial cable modem (for coaxial cable lines of the communication links 501), a fiber interface node (for fiber optic lines of the communication links 501), twisted-pair telephone modem, a wireless transceiver, and/or any other desired modem device. One modem is shown in FIG. 5, but a plurality of modems operating in parallel may be implemented within the interface 520. The interface 520 may comprise a gateway 511. The modem 510 may be connected to, or be a part of, the gateway 511. The gateway 511 may be a computing device that communicates with the modem(s) 510 to allow one or more other devices in the premises 502a to communicate with the local office 503 and/or with other devices beyond the local office 503 (e.g., via the local office 503 and the external network(s) 509). The gateway 511 may comprise a set-top box (STB), digital video recorder (DVR), a digital transport adapter (DTA), a computer server, and/or any other desired computing device.

The gateway 511 may also comprise one or more local network interfaces to communicate, via one or more local networks, with devices in the premises 502a. Such devices may comprise, e.g., display devices 512 (e.g., televisions), STBs or DVRs 513, personal computers 514, laptop computers 515, wireless devices 516 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 517 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 520 with the other devices in the premises 502a may represent wired or wireless connections, as may be appropriate for the type of local network used. One or more of the devices at the premises 502a may be configured to provide wireless communications channels (e.g., IEEE 802.11 channels) to communicate with one or more of the mobile devices 525, which may be on- or off-premises.

The mobile devices 525, one or more of the devices in the premises 502a, and/or other devices may receive, store, output, and/or otherwise use assets. An asset may comprise a video, a game, one or more images, software, audio, text, webpage(s), and/or other content.

Figure 6:
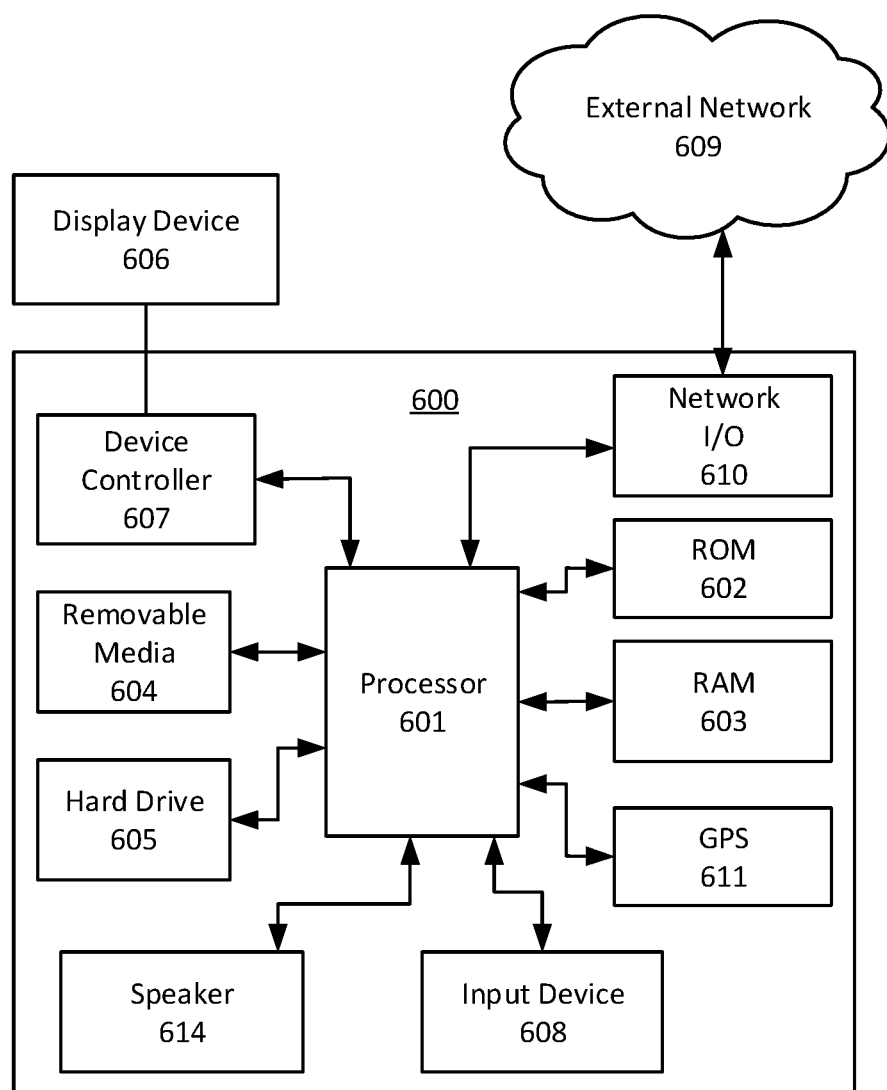
FIG. 6 shows hardware elements of a computing device.

FIG. 6 shows hardware elements of a computing device 600 that may be used to implement any of the computing devices shown in FIG. 5 (e.g., the mobile devices 525, any of the devices shown in the premises 502a, any of the devices shown in the local office 503, any of the wireless access points 527, any devices with the external network 509) and any other computing devices discussed herein, including one or more computing devices configured to act as one or more encoding devices and/or to execute the prediction engine 100. The computing device 600 may comprise one or more processors 601, which may execute instructions of a computer program to perform any of the functions described herein. The instructions may be stored in a read-only memory (ROM) 602, random access memory (RAM) 603, removable media 604 (e.g., a USB drive, a compact disk (CD), a digital versatile disk (DVD)), and/or in any other type of computer-readable medium or memory. Instructions may also be stored in an attached (or internal) hard drive 605 or other types of storage media. The computing device 600 may comprise one or more output devices, such as a display device 606 (e.g., an external television and/or other external or internal display device) and a speaker 614, and may comprise one or more output device controllers 607, such as a video processor. One or more user input devices 608 may comprise a remote control, a keyboard, a mouse, a touch screen (which may be integrated with the display device 606), microphone, etc. The computing device 600 may also comprise one or more network interfaces, such as a network input/output (I/O) interface 610 (e.g., a network card) to communicate with an external network 609. The network I/O interface 610 may be a wired interface (e.g., electrical, RF (via coax), optical (via fiber)), a wireless interface, or a combination of the two. The network I/O interface 610 may comprise a modem configured to communicate via the external network 609. The external network 609 may comprise the communication links 501 discussed above, the external network 509, an in-home network, a network provider's wireless, coaxial, fiber, or hybrid fiber/coaxial distribution system (e.g., a DOCSIS network), or any other desired network. The computing device 600 may comprise a location-detecting device, such as a global positioning system (GPS) microprocessor 611, which may be configured to receive and process global positioning signals and determine, with possible assistance from an external server and antenna, a geographic position of the computing device 600.

Although FIG. 6 shows an example hardware configuration, one or more of the elements of the computing device 600 may be implemented as software or a combination of hardware and software. Modifications may be made to add, remove, combine, divide, etc. components of the computing device 600. Additionally, the elements shown in FIG. 6 may be implemented using basic computing devices and components that have been configured to perform operations such as are described herein. For example, a memory of the computing device 600 may store computer-executable instructions that, when executed by the processor 601 and/or one or more other processors of the computing device 600, cause the computing device 600 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
  receiving, by a computing device, first metadata indicative of encoding of a media content item at a first resolution and a first bitrate;
  receiving, by the computing device, second metadata indicative of encoding of the media content item at a second resolution and a second bitrate; and
  based on a quality of the encoding of the media content item at the second resolution and the second bitrate satisfying a threshold:
    determining, based on the first metadata and the second metadata, a metadata trend corresponding to the media content item;
    determining, based on the metadata trend and characteristics of the media content item, that a second quality of an encoding of the media content item at a third bitrate and at a third resolution is predicted to satisfy the threshold; and
    sending, to an encoder, an indication of the third bitrate for encoding of the media content item at the third resolution.

2. The method of claim 1, wherein the characteristics of the media content item comprise a popularity of the media content item.

3. The method of claim 1, wherein the characteristics of the media content item comprise a genre of the media content item.

4. The method of claim 1, further comprising:
  determining, based on third metadata indicative of encoding of the media content item at the third resolution and the third bitrate, that a quality of the media content item encoded at the third resolution and the third bitrate is optimized; and
  sending, based on the determining that the quality of the media content item encoded at the third resolution and the third bitrate is optimized, an indication of a new bitrate for encoding the media content item at a fourth resolution higher than the third resolution.

5. The method of claim 1, further comprising:
  determining, based on third metadata indicative of encoding of the media content item at the third resolution and the third bitrate, that a quality of the media content item encoded at the third resolution and the third bitrate is not optimized; and
  sending, based on the determining that the quality of the media content item encoded at the third resolution and the third bitrate is not optimized, an indication of a lower bitrate for encoding the media content item at the third resolution.

6. The method of claim 1, further comprising:
  sending, to a second encoder different from the encoder, and based on third metadata indicative of encoding of the media content item at the third resolution and the third bitrate, an indication to encode the media content item.

7. The method of claim 1, further comprising:
  determining, based on third metadata indicative of encoding of the media content item at the third resolution and the third bitrate, a fourth bitrate for encoding a second media content item; and
  sending the fourth bitrate for encoding the second media content item.

8. An apparatus comprising:
  one or more processors; and
  memory storing instructions that, when executed by the one or more processors, cause the apparatus to:
    receive first metadata indicative of encoding of a media content item at a first resolution and a first bitrate;
    receive second metadata indicative of encoding of the media content item at a second resolution and a second bitrate;
    based on a quality of the encoding of the media content item at the second resolution and the second bitrate satisfying a threshold:
      determine, based on the first metadata and the second metadata, a metadata trend corresponding to the media content item;
      determine, based on the metadata trend and characteristics of the media content item, that a second quality of an encoding of the media content item at a third bitrate and a third resolution is predicted to satisfy the threshold; and
      send, to an encoder, an indication of the third bitrate for encoding of the media content item at the third resolution.

9. The apparatus of claim 8, wherein the instructions, when executed by the one or more processors, further cause the apparatus to:
  determine, based on third metadata indicative of encoding of the media content item at the third resolution and the third bitrate, a fourth bitrate for encoding the media content item at the third resolution; and
  send an indication of the fourth bitrate for encoding the media content item at the third resolution.

10. The apparatus of claim 8, wherein the instructions, when executed by the one or more processors, further cause the apparatus to:
  determine, based on third metadata indicative of encoding of the media content item at the third resolution and the third bitrate, that a quality of the media content item encoded at the third resolution and the third bitrate is not optimized; and
  send, based on the determining that the quality of the media content item encoded at the third resolution and the third bitrate is not optimized, an indication of a higher bitrate for encoding the media content item at the third resolution.

11. The apparatus of claim 8, wherein the instructions, when executed by the one or more processors, further cause the apparatus to:
  determine, based on third metadata indicative of encoding of the media content item at the third resolution and the third bitrate, that a quality of the media content item encoded at the third resolution and the third bitrate is optimized; and
  send, based on the determining that the quality of the media content item encoded at the third resolution and the third bitrate is optimized, an indication of a new bitrate for encoding the media content item at a fourth resolution higher than the third resolution.

12. The apparatus of claim 8, wherein the instructions, when executed by the one or more processors, further cause the apparatus to:

determine, based on third metadata indicative of encoding of the media content item at the third resolution and the third bitrate, that a quality of the media content item encoded at the third resolution and the third bitrate is not optimized; and send, based on the determining that the quality of the media content item encoded at the third resolution and the third bitrate is not optimized, an indication of a lower bitrate for encoding the media content item at the third resolution.

13. The apparatus of claim 8, wherein the instructions, when executed by the one or more processors, further cause the apparatus to:

send, to a second encoder different from the encoder, and based on third metadata indicative of encoding of the media content item at the third resolution and the third bitrate, an indication to encode the media content item.

14. The apparatus of claim 8, wherein the instructions, when executed by the one or more processors, further cause the apparatus to:

determine, based on third metadata indicative of encoding of the media content item at the third resolution and the third bitrate, a fourth bitrate for encoding a second media content item; and send the fourth bitrate for encoding the second media content item.

15. A non-transitory computer-readable medium storing instructions that, when executed, cause:

receiving first metadata indicative of encoding of a media content item at a first resolution and a first bitrate;

receiving second metadata indicative of encoding of the media content item at a second resolution and a second bitrate;

based on a quality of the encoding of the media content item at the second resolution and the second bitrate satisfying a threshold:

determining, based on the first metadata and the second metadata, a metadata trend corresponding to the media content item;

determining, based on the metadata trend and characteristics of the media content item, that a second quality of an encoding of the media content item at a third bitrate and a third resolution is predicted to satisfy the threshold; and sending, to an encoder, an indication of the third bitrate for encoding of the media content item at the third resolution.

16. The non-transitory computer-readable medium of claim 15, wherein the instructions, when executed, further cause:

determining, based on third metadata indicative of encoding of the media content item at the third resolution and the third bitrate, a fourth bitrate for encoding the media content item at the third resolution; and sending an indication of the fourth bitrate for encoding the media content item at the third resolution.

17. The non-transitory computer-readable medium of claim 15, wherein the instructions, when executed, further cause:

determining, based on third metadata indicative of encoding of the media content item at the third resolution and the third bitrate, that a quality of the media content item encoded at the third resolution and the third bitrate is not optimized; and sending, based on the determining that the quality of the media content item encoded at the third resolution and the third bitrate is not optimized, an indication of a higher bitrate for encoding the media content item at the third resolution.

18. The non-transitory computer-readable medium of claim 15, wherein the instructions, when executed, further cause:

determining, based on third metadata indicative of encoding of the media content item at the third resolution and the third bitrate, that a quality of the media content item encoded at the third resolution and the third bitrate is optimized; and sending, based on the determining that the quality of the media content item encoded at the third resolution and the third bitrate is optimized, an indication of a new bitrate for encoding the media content item at a fourth resolution higher than the third resolution.

19. The non-transitory computer-readable medium of claim 15, wherein the instructions, when executed, further cause:

determining, based on third metadata indicative of encoding of the media content item at the third resolution and the third bitrate, that a quality of the media content item encoded at the third resolution and the third bitrate is not optimized; and sending, based on the determining that the quality of the media content item encoded at the third resolution and the third bitrate is not optimized, an indication of a lower bitrate for encoding the media content item at the third resolution.

20. The non-transitory computer-readable medium of claim 15, wherein the instructions, when executed, further cause:

sending, to a second encoder different from the encoder, and based on third metadata indicative of encoding of the media content item at the third resolution and the third bitrate, an indication to encode the media content item.

* * * * *